UNITED STATES PATENT OFFICE.

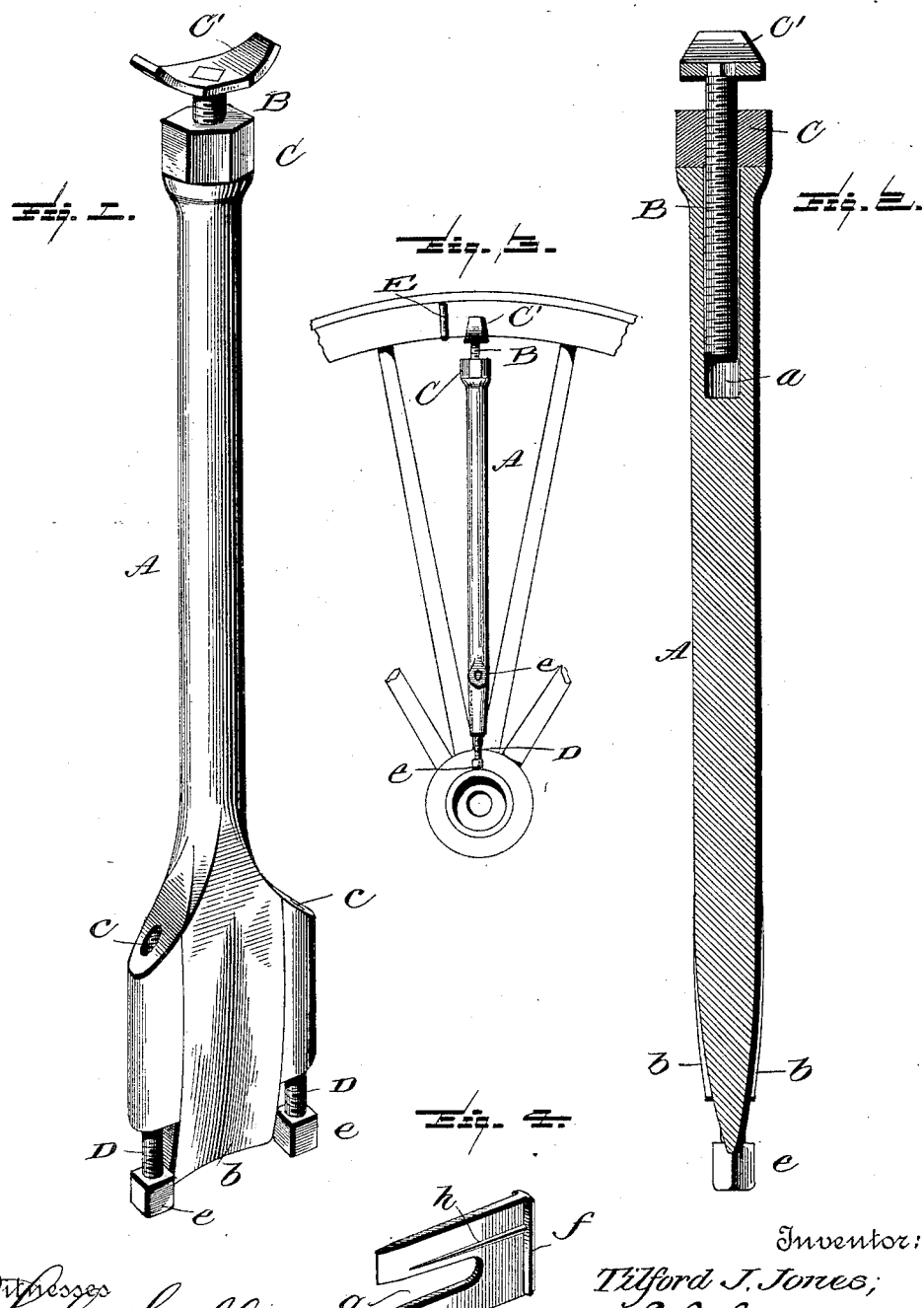

TILFORD J. JONES, OF BOGARD, MISSOURI, ASSIGNOR OF ONE-HALF TO JOHN W. SHIRLEY, OF SAME PLACE.

TIRE-TIGHTENER.

SPECIFICATION forming part of Letters Patent No. 462,355, dated November 3, 1891.

Application filed July 25, 1891. Serial No. 400,727. (No model.)

*To all whom it may concern:*

Be it known that I, TILFORD J. JONES, a citizen of the United States, residing at Bogard, in the county of Carroll, State of Missouri, have invented certain new and useful Improvements in Tire-Tighteners, of which the following is a specification, reference being had therein to the accompanying drawings.

This invention relates to certain new and useful improvements in tire-tighteners; and it has for its objects, among others, to provide an improved, simple, cheap, and durable and efficient tire-tightener by which the tire can be quickly and easily tightened, and by which the desired dish may be given to the wheel. I provide a shank or body-piece with screw-threaded sockets for the reception of screw-bolts designed to bear upon the hub upon each side of the spoke, so that by the adjustment of either one or the other the dish may be given to the wheel. I provide an improved wedge to be inserted between the sections of the felly that are opened by the outward pressure thereon.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a perspective view of my improved tire-tightener. Fig. 2 is a longitudinal section through the same. Fig. 3 is a side elevation of a portion of a wheel, showing the application of my device. Fig. 4 is a perspective view of the wedge.

Like letters of reference indicate like parts throughout the several views in which they occur.

Referring now to the details of the drawings by letter, A designates the body or shank of the device, which at one end is formed with a socket $a$, into which is loosely fitted the screw-bolt B, with which the nut C engages, as shown best in Fig. 2, the outer end of the bolt carrying the curved or concave plate C′, which is designed to bear against the inner face of the felly of the wheel and embrace it, as seen in Fig. 3. The other end of the body or shank is tapered, as seen in Figs. 1 and 2, and preferably concaved, as seen at $b$, to permit it to fit snugly between the two spokes near the hub, as seen in Fig. 3. Upon opposite sides or edges of this tapered end there are provided the sockets $c$, which may be integral therewith or formed separately and attached thereto in any suitable manner.

D are screw-bolts engaging the screw-heads of the sockets and provided with polygonal heads $e$, as seen best in Fig. 1, by which they may be turned.

The operation is simple and apparent. The device is applied, as shown in Fig. 3, the tapered end fitted between two spokes at the hub and the plate C′ placed against the inner face of the felly, and the nut C turned up to force the felly outward the required distance, and then a washer is placed upon the tenon end of the spoke in the ordinary manner to keep the tire from returning to its former position and thus keep the tire tightened. The manipulation of the screw-bolts D gives the required dish to the wheel. As the felly is forced outward to tighten the tire, it also spreads at the joints between the sections, and in order to fill the crack or opening thus formed I provide a wedge E, as shown best in Fig. 4, it being provided with a head $f$, bifurcated portion $g$, and longitudinal wedge-shaped ribs $h$. The wedge is applied by passing it through from side to side of the felly in the opening between the two sections and then turning one leg in one direction against one section of the felly and the other leg in the opposite direction against the other section of felly. The ribs serve to hold the wedge against displacement. More than one of these wedges may be employed, if found necessary.

The device is simple, cheap, and durable, and in practice has proved most efficient for the purpose for which it is intended.

Modifications in detail may be resorted to without departing from the spirit of the invention or sacrificing any of its advantages.

What I claim as new is—

1. The combination, with the shank and its adjusting-bolt and plate, of adjusting means at the hub end extended beyond the end of the shank for regulating the dish of the wheel, as set forth.

2. The combination, with the shank and its adjusting-nut, bolt, and plate, of the screw-bolts at the hub end of the shank provided with means for turning them, as and for the purposes specified.

3. The tire-tightener consisting of the shank with socket at one end and screw-bolt working loosely in said socket, the adjusting-nut on the outer end of the said bolt, the plate on the end of the bolt, and the adjusting-screws at the hub end of the shank engaging screws in sockets at said end and provided with polygonal heads, substantially as and for the purpose specified.

4. A wedge for the purpose specified, formed with a head, longitudinal wedge-shaped ribs, and bifurcated at its thinner end, substantially as shown and described.

In testimony whereof I affix my signature in presence of two witnesses.

TILFORD J. JONES.

Witnesses:
C. W. NEWLAND,
G. A. FLEMING.